US012683821B2

(12) United States Patent
Buchwald et al.

(10) Patent No.: US 12,683,821 B2
(45) Date of Patent: Jul. 14, 2026

(54) MULTIPLE ALPHA BETA PAIRS IN CONSENSUS PROTOCOLS

(71) Applicant: Ava Labs, Inc., New York, NY (US)

(72) Inventors: Aaron Buchwald, New York, NY (US); Stephen John Buttolph, Brooklyn, NY (US); Andrew Lewis-Pye, London (GB); Patrick Robert O'Grady, Palo Alto, CA (US); Kevin Sekniqi, Sunny Isles Beach, FL (US)

(73) Assignee: Ava Labs, Inc., New York, NY (US)

( * ) Notice: Subject to any disclaimer, the term of this patent is extended or adjusted under 35 U.S.C. 154(b) by 0 days.

(21) Appl. No.: 19/170,410

(22) Filed: Apr. 4, 2025

(65) Prior Publication Data

US 2025/0317311 A1      Oct. 9, 2025

Related U.S. Application Data

(60) Provisional application No. 63/574,552, filed on Apr. 4, 2024.

(51) Int. Cl.
*H04L 9/00* (2022.01)
(52) U.S. Cl.
CPC ..................................... *H04L 9/50* (2022.05)
(58) Field of Classification Search
CPC ...................................................... H04L 9/50
See application file for complete search history.

(56) References Cited

U.S. PATENT DOCUMENTS

| | | | |
|---|---|---|---|
| 11,860,753 B1 * | 1/2024 | Boss ................... | G06F 11/3006 |
| 2019/0129893 A1 * | 5/2019 | Baird, III ............ | G06F 16/1873 |
| 2019/0227850 A1 * | 7/2019 | Chapman ................ | G06F 9/455 |
| 2019/0384927 A1 * | 12/2019 | Bhatnagar ............. | G06F 21/602 |
| 2020/0294158 A1 * | 9/2020 | Karame ................ | H04L 9/3236 |

(Continued)

OTHER PUBLICATIONS

Buchwald, A., et al., Frosty: Bringing strong liveness guarantees to the Snow family of consensus protocols. Sep. 30, 2024, 26 pages, arXiv:2404.14250 [cs.DC], https://doi.org/10.48550/arXiv.2404. 14250.

(Continued)

*Primary Examiner* — Blake I Narramore
(74) *Attorney, Agent, or Firm* — McDermott Will & Schulte LLP

(57) ABSTRACT

A method determines a current preference value, the current preference value being one of two possible values. The method receives k preference values, each being one of the possible values. The method defines alpha1, alpha2, and beta2, with alpha1>than k/2 and alpha2≥alpha1. Responsive to a determination that at least alpha1 of the k preference values are different than the current preference value, the method changes the current preference value. Responsive to a determination that fewer than alpha2 of the k preference values are equal to the current preference value, the method sets a counter to zero. Responsive to a third determination that at least alpha2 of the k preference values are equal to the current preference value, the method increases the counter by 1. Responsive to a determination that the counter is equal to beta2, the method provides the current preference value as a finalized output.

20 Claims, 8 Drawing Sheets

100 ⇥

(56)           References Cited

U.S. PATENT DOCUMENTS

| | | | |
|---|---|---|---|
| 2020/0344070 A1 | 10/2020 | Li | |
| 2021/0018953 A1* | 1/2021 | Ford | G06F 1/10 |
| 2021/0097059 A1* | 4/2021 | Huang | G06F 16/219 |
| 2021/0117410 A1* | 4/2021 | Sekniqi | G06Q 40/00 |
| 2021/0167942 A1* | 6/2021 | Zhang | H04L 9/0618 |
| 2021/0281980 A1* | 9/2021 | Xu | H04L 9/3239 |
| 2021/0374125 A1* | 12/2021 | Kumar | G06F 16/2379 |
| 2022/0116225 A1 | 4/2022 | Cohen et al. | |
| 2022/0158892 A1* | 5/2022 | Fedorov | G06F 11/1482 |
| 2023/0062434 A1* | 3/2023 | Wagner | G06Q 20/405 |
| 2023/0409450 A1 | 12/2023 | Yang et al. | |

OTHER PUBLICATIONS

Buttolph, S., Split Alpha into AlphaPreference and AlphaConfidence #2125. Oct. 6, 2023, 16 pages. Retrieved on May 12, 2025 from <https://github.com/ava-labs/avalanchego/pull/2125>.
International Search Report and Written Opinion for International Patent Application No. PCT/US2025/023207, mailed Jun. 25, 2025 (7 pages).

* cited by examiner

FIG. 4

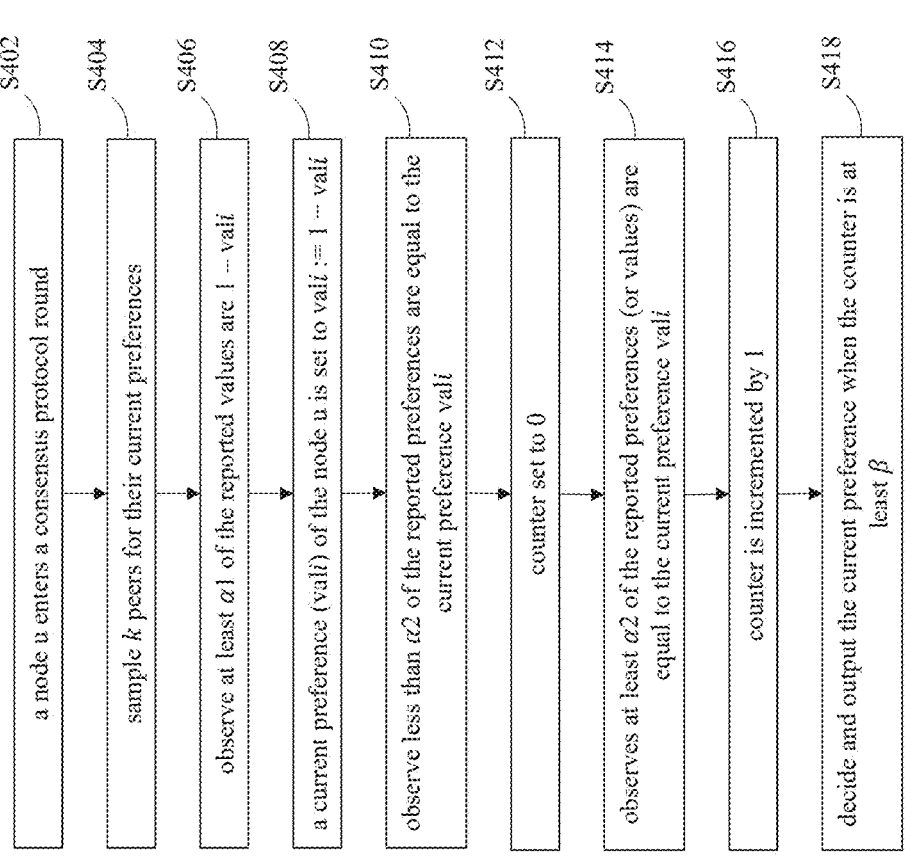

S402 — a node u enters a consensus protocol round

S404 — sample k peers for their current preferences

S406 — observe at least α1 of the reported values are 1 – vali

S408 — a current preference (vali) of the node u is set to vali := 1 – vali

S410 — observe less than α2 of the reported preferences are equal to the current preference vali S412 — counter set to 0

S414 — observes at least α2 of the reported preferences (or values) are equal to the current preference vali S416 — counter is incremented by 1

S418 — decide and output the current preference when the counter is at least β

Figure 5A:
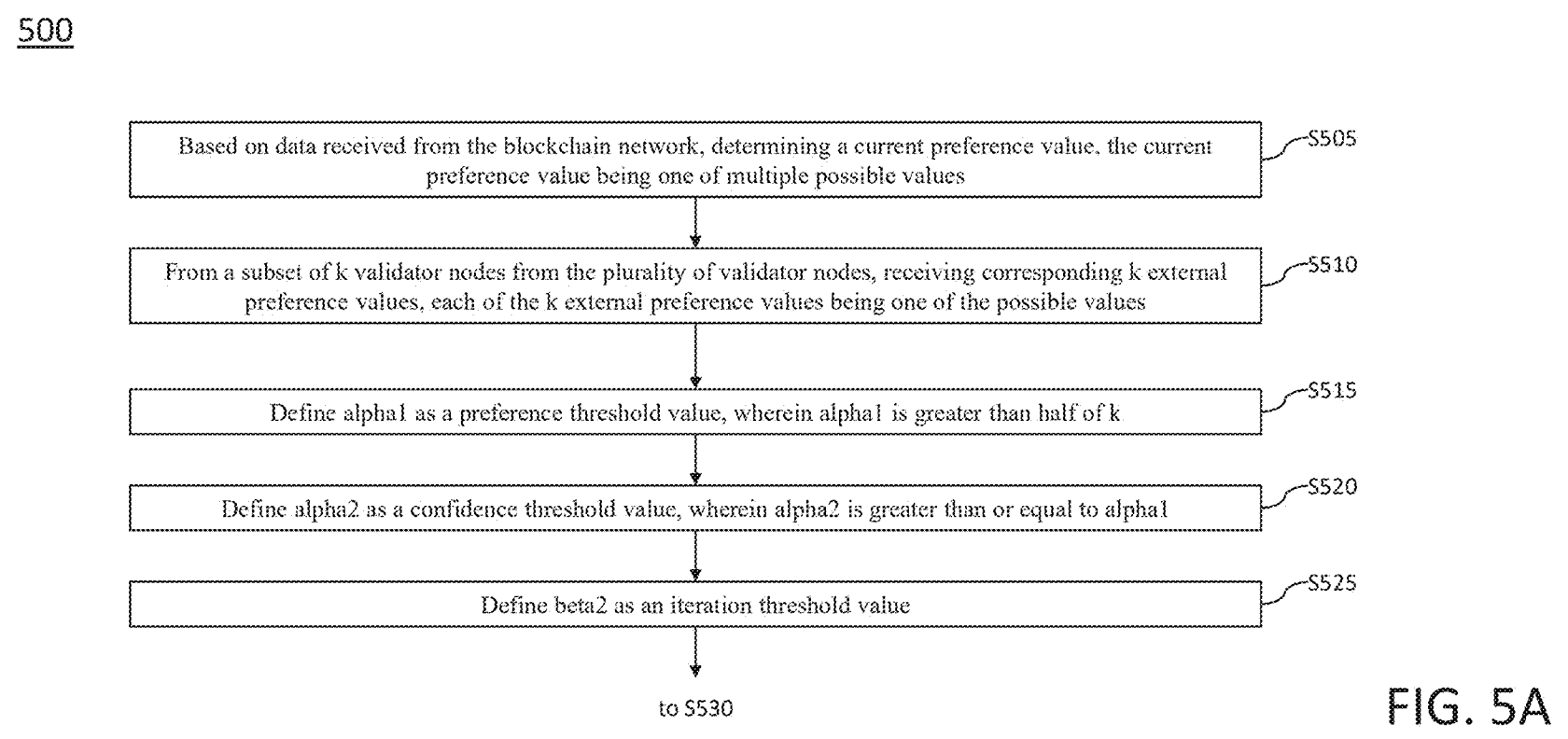

S505 — Based on data received from the blockchain network, determining a current preference value, the current preference value being one of multiple possible values S510 — From a subset of k validator nodes from the plurality of validator nodes, receiving corresponding k external preference values, each of the k external preference values being one of the possible values S515 — Define alpha1 as a preference threshold value, wherein alpha1 is greater than half of k S520 — Define alpha2 as a confidence threshold value, wherein alpha2 is greater than or equal to alpha1

S525 — Define beta2 as an iteration threshold value to S530

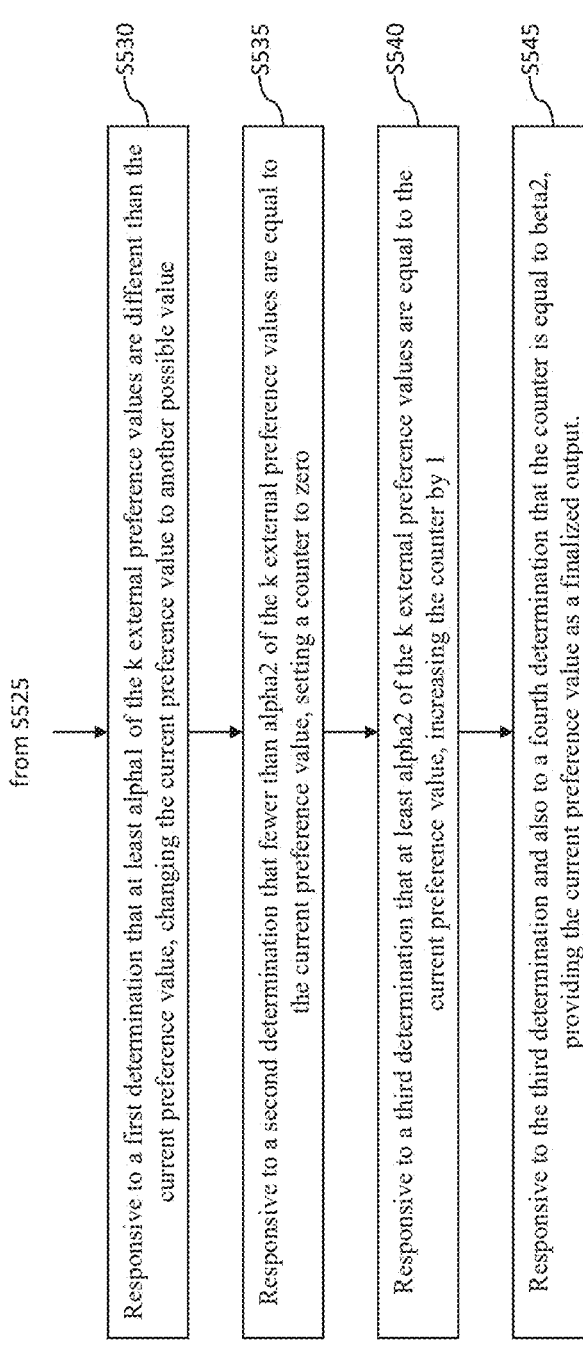

from S525

Responsive to a first determination that at least alpha1 of the k external preference values are different than the current preference value, changing the current preference value to another possible value ⌐S530

Responsive to a second determination that fewer than alpha2 of the k external preference values are equal to the current preference value, setting a counter to zero ⌐S535

Responsive to a third determination that at least alpha2 of the k external preference values are equal to the current preference value, increasing the counter by 1 ⌐S540

Responsive to the third determination and also to a fourth determination that the counter is equal to beta2, providing the current preference value as a finalized output. ⌐S545

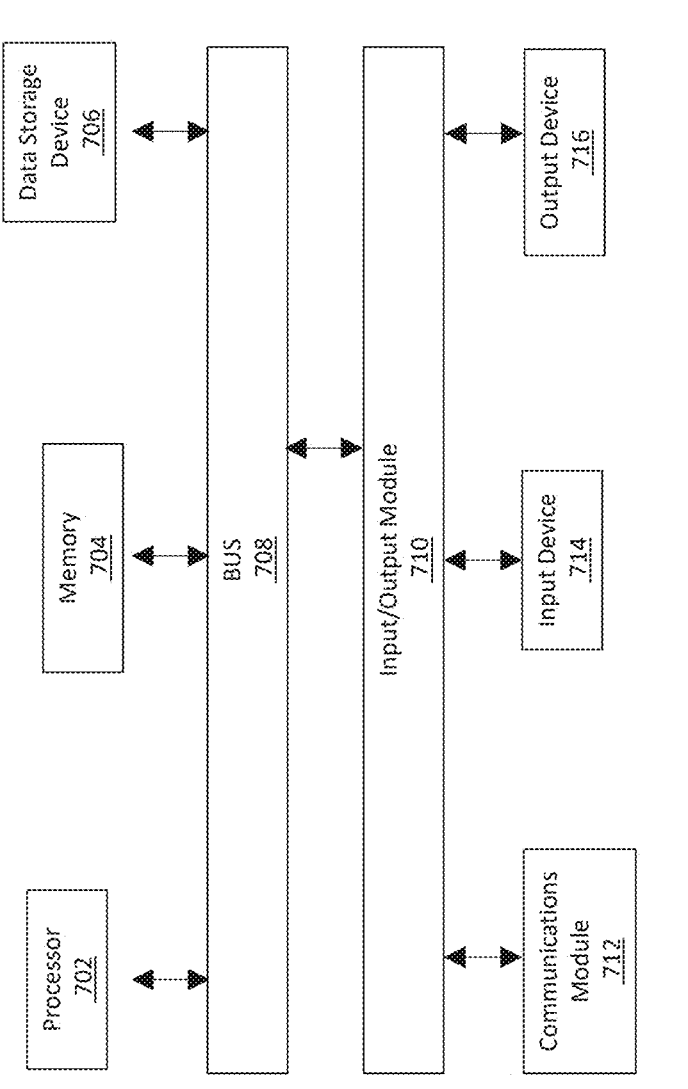
FIG. 7

MULTIPLE ALPHA BETA PAIRS IN CONSENSUS PROTOCOLS

CROSS-REFERENCE OF RELATED APPLICATION

This application claims the benefit of U.S. Provisional Application No. 63/574,552, filed on Apr. 4, 2024, and which is incorporated herein in its entirety.

TECHNICAL FIELD

The present disclosure generally relates to a blockchain technology. More specifically, the present disclosure relates to consensus mechanisms for blockchain platforms.

BACKGROUND

A blockchain is a database that maintains records for transactions and tracking of assets in blocks. A blockchain network includes nodes such as a validator node that participates in consensus. Validator nodes are capable of verifying, voting on, staking and/or maintaining a record of transactions for the blockchain network as well as storing a copy of the blockchain. Validators are also responsible for producing and/or proposing blocks for addition to the blockchain network. Validators can participate in a consensus voting protocol for implementation of blockchain deployments or building on subnets. Factors such as liveness and safety of consensus mechanisms of blockchain networks may be considered and valued differently depending on the blockchain. Liveness of a consensus mechanism represents the guarantee that a protocol can exchange messages between nodes of a blockchain network, allowing the nodes to eventually come to a consensus. The safety of a consensus mechanism represents the guarantee that a consensus or value between nodes is consistent across the nodes of the blockchain network. However, there is a tradeoff between performance (e.g., required rounds of until termination) and safety. As such, there is a need for improved consensus protocols that provide both safety and performance.

SUMMARY

Some embodiments of the present disclosure provide a method for determining consensus on a blockchain network comprising a plurality of validator nodes. The method includes, based on data received from the blockchain network, determining a current preference value, the current preference value being one of two possible values. The method further includes, from a subset of k validator nodes from the plurality of validator nodes, receiving corresponding k external preference values, each of the k external preference values being one of the two possible values. The method further includes defining alpha1 as a preference threshold value, wherein alpha1 is greater than half of k, defining alpha2 as a confidence threshold value, wherein alpha2 is greater than or equal to alpha1, and defining beta2 as an iteration threshold value. The method further includes, responsive to a first determination that at least alpha1 of the k external preference values are different than the current preference value, changing the current preference value to another possible value. The method further includes, responsive to a second determination that fewer than alpha2 of the k external preference values are equal to the current preference value, setting a counter to zero. The method further includes, responsive to a third determination that at least alpha2 of the k external preference values are equal to the current preference value, increasing the counter by 1. The method further includes, responsive to the third determination and also to a fourth determination that the counter is equal to beta2, providing the current preference value as a finalized output.

Some embodiments of the present disclosure provide a non-transitory computer-readable medium storing a program for determining consensus on a blockchain network comprising a plurality of validator nodes. The program, when executed by a computer, configures the computer to, based on data received from the blockchain network, determine a current preference value, the current preference value being one of two possible values. The program, when executed by a computer, further configures the computer to, from a subset of k validator nodes from the plurality of validator nodes, receive corresponding k external preference values, each of the k external preference values being one of the two possible values. The program, when executed by a computer, further configures the computer to define alpha1 as a preference threshold value, wherein alpha1 is greater than half of k, define alpha2 as a confidence threshold value, wherein alpha2 is greater than or equal to alpha1, and define beta2 as an iteration threshold value. The program, when executed by a computer, further configures the computer to, responsive to a first determination that at least alpha1 of the k external preference values are different than the current preference value, change the current preference value to another possible value. The program, when executed by a computer, further configures the computer to, responsive to a second determination that fewer than alpha2 of the k external preference values are equal to the current preference value, set a counter to zero. The program, when executed by a computer, further configures the computer to, responsive to a third determination that at least alpha2 of the k external preference values are equal to the current preference value, increase the counter by 1. The program, when executed by a computer, further configures the computer to, responsive to the third determination and also to a fourth determination that the counter is equal to beta2, provide the current preference value as a finalized output.

Some embodiments of the present disclosure provide a system for determining consensus on a blockchain network comprising a plurality of validator nodes. The system comprises a processor and a non-transitory computer readable medium storing a set of instructions, which when executed by the processor, configure the system to, based on data received from the blockchain network, determine a current preference value, the current preference value being one of two possible values. The set of instructions, when executed by the processor, further configures the system to, from a subset of k validator nodes from the plurality of validator nodes, receive corresponding k external preference values, each of the k external preference values being one of the two possible values. The set of instructions, when executed by the processor, further configures the system to define alpha1 as a preference threshold value, wherein alpha1 is greater than half of k, define alpha2 as a confidence threshold value, wherein alpha2 is greater than or equal to alpha1, and define beta2 as an iteration threshold value. The set of instructions, when executed by the processor, further configures the system to, responsive to a first determination that at least alpha1 of the k external preference values are different than the current preference value, change the current preference value to another possible value. The set of instructions, when executed by the processor, further configures the system to, responsive to a second determination that fewer than alpha2 of the k external preference values are equal to the current preference value, set a counter to zero. The set of instructions, when executed by the processor, further configures the system to, responsive to a third determination that at least alpha2 of the k external preference values are equal to the current preference value, increase the counter by 1. The set of instructions, when executed by the processor, further configures the system to, responsive to the third determination and also to a fourth determination that the counter is equal to beta2, provide the current preference value as a finalized output.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments.

FIG. 4 is a flowchart illustrating a process of a consensus protocol including a multiple alpha consensus mechanism, according to some embodiments.

FIG. 5A and FIG. 5B are a flowchart a process of a consensus protocol including a multiple alpha consensus mechanism, according to some embodiments.

FIG. 7 is a block diagram illustrating an exemplary computer system with which aspects of the subject technology can be implemented.

Figure 1:
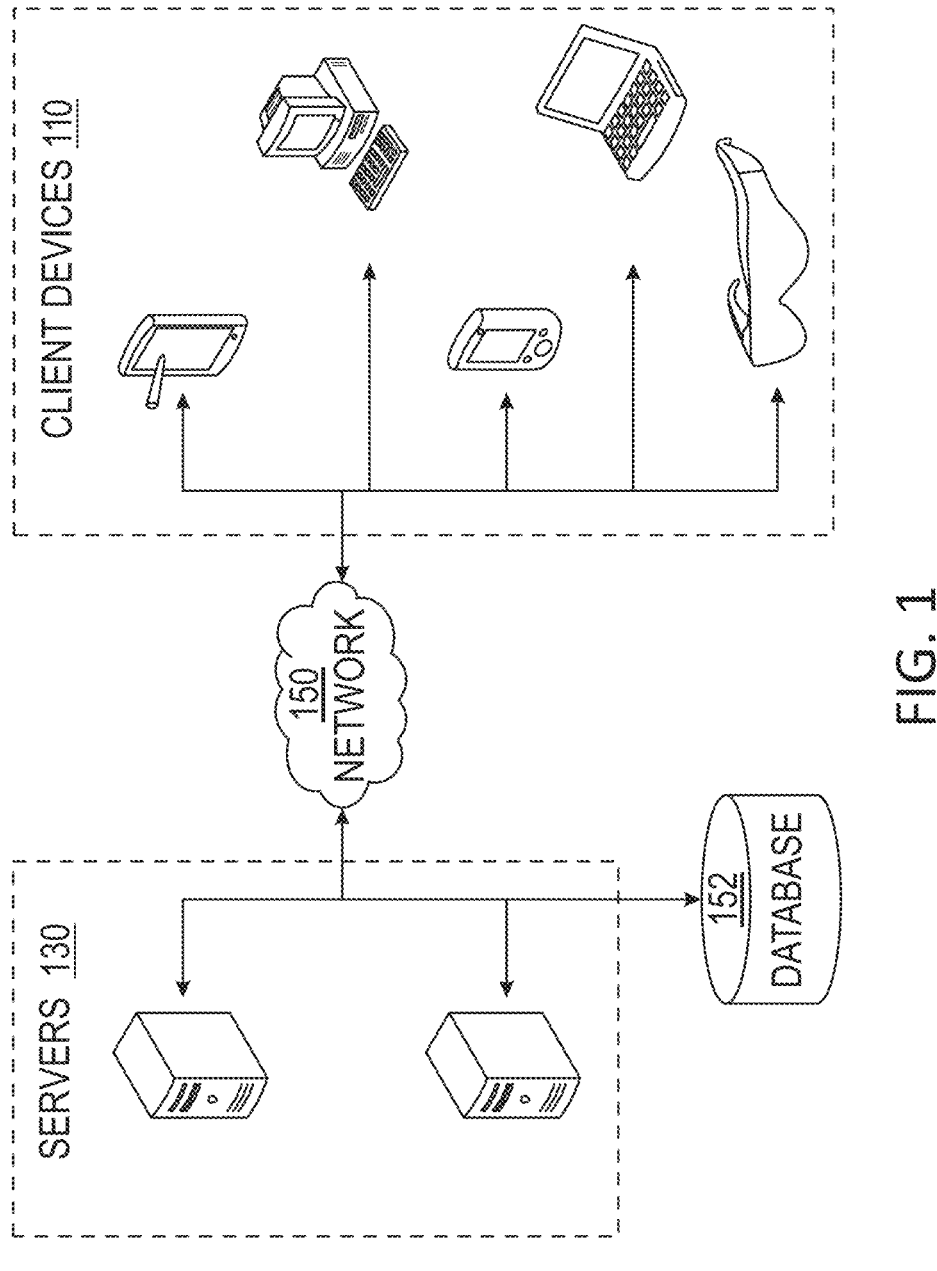
FIG. 1 is a block diagram of a device operating environment with which aspects of the present disclosure can be implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

All references cited anywhere in this specification, including the Background and Detailed Description sections, are incorporated by reference as if each had been individually incorporated.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

Blockchain platforms, such as for smart contracts, may utilize a consensus protocol as a fundamental building block for building distributed systems. As an example, a blockchain platform can include multiple blockchains (equivalently referred to as subnets), that can be used for different types of applications, including but not limited to a component exchange blockchain for creating and trading digital smart assets, a metadata blockchain for coordinating validators as well as tracking and creating subnets, and a contract blockchain for creating smart contracts on the blockchain network.

A "blockchain" may be a linear chain of blocks of the same dimension, such as the same height, size, length, etc. As used herein, "block" generally refers to a record of information that is kept in a blockchain. For example, each block may contain a cryptographic hash of the previous block, a timestamp, and transaction data. The state of each block and/or the transaction data may be represented as a Merkle tree root hash.

The term "subnet" as used herein refers, according to some embodiments, to independent blockchain networks that run on top of the parent blockchain platform and allow developers and organizations to create custom blockchains with their own rules, consensus mechanisms, and token economics. A subnet may include a dynamic set of nodes (e.g., one or more validators) seeking to achieve consensus on a state of a set of blockchains such that one blockchain is validated by one subnet, although one subnet can validate multiple blockchains. A node can participate in the validation of multiple subnets and can be subject to requirements of the blockchains within those subnets, such as for security, licensing, hardware and/or the like.

Blockchains being validated by validators may be blockchain networks with application-level logic defined by multiple virtual machines (VMs) which enable more decentralized networks. In particular, a blockchain may be an instance of a VM that specifies the blockchain's state, state transition function, transactions, and application programming interface (API) for user interaction. The VM may allow execution of smart contracts and decentralized applications on the blockchain, providing a secure and deterministic environment for code execution and enabling interoperability between blockchains or cross-chain communication.

The consensus protocol can be used to coordinate blockchains on the blockchain platform. For example, the consensus protocol can be used for the metadata blockchain and/or the contract blockchain for building consensus for validators such as for custom subnets, execution of smart contracts, etc. Consensus mechanisms (as part of the broader consensus protocol) may integrate memory into the consensus process, where nodes retain information about previous votes to make more informed decisions. This stage adds an element of confidence to the voting process, where nodes become more confident in their decisions when they observe other nodes making similar choices. Consensus mechanisms may implement quorum-based consensus that can achieve arbitrarily low failure probabilities.

In some embodiments, consensus mechanisms may specify parameters k (sample size), alpha (required threshold for a sample to be "successful"), and beta (number of consecutive "successful" samples to commit a value). The consensus mechanisms may be performed in a network of n nodes by repeating a sampling process until a decision is made.

In some embodiments, consensus mechanisms use the same alpha value for both updating the preference and incrementing the confidence counter towards beta consecutive successful queries. In some embodiments, consensus mechanisms (e.g., dual-alpha or Snowflake+[1], [2]) may separate alpha into two alpha values and use an alpha preference value of k/2+1, and a higher alpha confidence value used to increment confidence towards finalizing a decision. Decoupling these alpha values allows using a lower value for flipping the preference.

For example, if a node is willing to flip a preference from blue to red at a lower threshold, then more of the network will be willing to flip their preference when the network is near (but not quite at) a 50-50 split. Additionally, as soon as the network tilts a little bit away from the 50-50 split, it significantly increases the probability nodes will flip towards the color that is already preferred by the network. For example, once the proportion of the population who are red passes a certain tipping point, it holds with high probability that the remainder of the (non-Byzantine) population will quickly become red (and symmetrically so for blue).

In some embodiments, if beta ($\beta$) is set appropriately, then the chance that any correct node decides on red before this tipping point is reached can be made negligible, meaning that once any correct processor decides on red (or blue), they can be sure that all other correct processors will quickly decide the same way. The chance that correct processors decide differently can thus be made negligible through an appropriate choice of parameter values. If correct processors begin heavily weighted in favor of one color, then convergence on a decision value may happen very quickly, while variance in random sampling may be required to tip the population in one direction in the case that initial inputs are evenly distributed.

In some embodiments, while using a lower alpha threshold can accelerate the network away from a bivalent (two-option) state more quickly, waiting for an almost 50-50 split in node preferences is not the most efficient use of processing time and information in the long run.

By non-limiting example, in a network with k=20, alpha=15, and beta=20, if a poll observes 20/20 correct responses, then it may be treated identically to a scenario where the observed ratio of correct responses is 15/20. This amounts to a waste of the extra information included in the poll. The multiple alpha consensus mechanism may utilize this information by maintaining separate confidence counters for multiple alpha thresholds and notices that the beta values required to reach the same probability of success are lower for higher alpha thresholds. This enables the multiple alpha consensus mechanism to finalize a decision more quickly (e.g., compared to a consensus mechanism relies on a same alpha value). For example, if a node observes 20/20 successful responses, the probability the network has reached a tipping point is the same after observing this 5 times in a row as if the node had observed 15/20 twenty times in a row. The multiple alpha consensus mechanism thus makes more efficient use of the information available to it to terminate quickly, reducing the number of required rounds particularly in the happy path where the network is initialized to preferring the same color and nearly all nodes behave correctly.

In some embodiments of the multiple alpha consensus mechanism, different values of alpha may give rise to a number of different conditions for termination. For example, each alpha may give rise to a different beta that determines the conditions for termination.

According to some embodiments, in addition to the multiple alpha-beta pairs, consensus protocols may include an alpha3 threshold. The alpha3 parameter modifies the sample, so that peers include both their preference and their last accepted block. If an alpha3 threshold of peers in beta3 consecutive polls report a value as finalized, then the node commits the corresponding value.

The alpha3 change assumes at most some portion of the network is byzantine (e.g., ⅕ of the network, as a non-limiting examples) and may behave arbitrarily. The portion of the network that is byzantine may be a parameterized value. If any correct node has accepted a value, then all correct nodes should eventually accept as well. Therefore, alpha3 asks peers whether they have accepted a value and can accept a value if the observed results indicate that there is a less than epsilon chance no correct node has accepted the value.

This is different from the normal decision mechanism of consensus protocols, which needs to reason about whether a sufficient majority of the network shares a preference, such that the network has reached a point of irreversibility. This requires a much higher threshold than needing to detect only that at least one correct node has finalized a decision.

In some embodiments, consensus protocols may implement all-to-all fallback to restore liveness to a consensus protocol (e.g., transitioning to a slow, fallback consensus protocol when liveness is a running, fast consensus protocol is threatened). Nodes running the consensus protocol may expect to finalize within a predefined finite number of rounds and freeze and signal an error (i.e., indicating that they are stuck) if they fail to do so. If the protocol is probabilistic, an attacker could cause some correct nodes to stall while allowing others to make progress. As such, the case that only one correct node stalls must be addressed. Additionally, assuming up to ⅕ of the network may be byzantine, the all-to-all protocol cannot be entered until at least ⅕+1 of the nodes in the network signal have stalled to ensure the byzantine nodes cannot trivially force the correct nodes to fall back to the all-to-all protocol. This creates a potential situation where some correct nodes have stalled and others continue to make progress, such that there's not enough to enter the all-to-all protocol. As a result, a blockchain network needs a way to unblock the correct nodes that have attempted to start the all-to-all protocol when the rest of the network keeps making progress. The introduction of the alpha3 decision condition handles this case by allowing correct, but stalled nodes, to observe that the rest of the network has finalized a decision, so that it can move on.

FIG. 1 is a block diagram of a device operating environment with which aspects of the present disclosure can be implemented. FIG. 1 illustrates an exemplary blockchain network architecture 100 to provide a blockchain platform (e.g., blockchain network implementation/deployment platform) for managing the proposal of blocks to be added to a blockchain, according to some embodiments. The blockchain network architecture 100 of FIG. 1 includes one or more participants 110 and one or more participants 130 which are communicatively coupled through the network 150.

The blockchain network architecture 100 can be a distributed database that maintains a continuously growing list of ordered records as the blocks. The blockchain architecture may implement methods and systems according to one or more embodiments (e.g., multiple alpha consensus mechanism according to embodiments). It is understood that the participants 130 may include the participants 110 as well, such that they are peers.

For example, the participants 110/130 may be clients of the blockchain platform for creating, expanding, or otherwise modifying customized blockchain networks and/or private or public subnets. As an example, the participants 110 may be different computers linked by the network 150 in a blockchain network having a same database. As an example, the participants 110/130 can function as validators or proposers to propose or add blocks to an existing blockchain. As an example, the participants 110 and/or the participants 130 may themselves be, or may execute, virtual machines (VMs) that function as nodes of the blockchain network architecture 100 and run software to verify block and transaction data, store data, validate, respond to network requests for data, and/or the like for the existing blockchain. VMs can be computers that run on blockchain and allow smart contracts from multiple sources to interact with one another. The participants 110 can generate blocks upon request by the participants 130, such as via a consensus engine or module of the participants 130 at a particular time such as during a specified temporal submission window. The blocks being generated and proposed for addition to the existing blockchain may be validated as being a valid block before its addition.

As a non-limiting example, one or more participants 110 may have access to at least one blockchain network hosted by the participants 130. As another non-limiting example, the participants 130 may provide services such as Internet based services including web2 services and web3 services, for example, to the participants 110.

The network 150 may include a wired network (e.g., via fiber optic or copper wire, telephone lines, and the like) or wireless network (e.g., a cellular network, radio-frequency (RF) network, Wi-Fi, Bluetooth, and the like). The network 150 may further include one or more of a local area network (LAN), a wide area network (WAN), the Internet, and the like. Further, the network 150 may include, but is not limited to, any one or more of the following network topologies, including a bus network, a star network, a ring network, a mesh network, and the like.

The participants 110 may include any one of a laptop computer, a desktop computer, or a mobile device such as a smart phone, a palm device, a tablet device, a television, a wearable device, a display device, and/or the like. The participants 110 can be controlled by users as a set of validator nodes for making decisions in tandem, such as for facilitating operation or design of the blockchain implementations of the blockchain platform.

In some embodiments, the participants 130 may be a cloud server or a group of cloud servers. In other embodiments, some or all of the participants 130 may not be cloud-based servers (i.e., may be implemented outside of a cloud computing environment, including but not limited to an on-premises environment), or may be partially cloud-based. Some or all of the participants 130 may be a computing device such as part of a cloud computing server including one or more desktop computers or panels mounted on racks, and/or the like. The panels may include processing boards and also switchboards, routers, and other network devices. In some embodiments, the participants 130 may include the participants 110 as well, such that they are peers.

As discussed herein, the blockchain network architecture 100 can incorporate application of a consensus protocol that is high throughput, totally-ordered, and effective for smart contracts. Smart contracts may refer to self-executing computer programs, applications, or contracts for executing transactions such as financial transactions involving cryptocurrency. The blockchain network architecture 100 may be used for creation of custom blockchains (including private blockchains) and decentralized applications (dApps). The consensus protocol may be for agreement on user transactions, adding blocks to the existing blockchain, interaction with external resources (e.g., off-chain), etc. The consensus protocol implemented by the blockchain network architecture 100 may be a de-centralized, leaderless block proposal mechanism that handles multiple valid block proposals concurrently and limits the submission of proposals for the existing blockchain. As an example, the blockchain network architecture 100 may use repeated subsample voting and validators may provide strong probabilistic guarantees of correctness (e.g., safety and liveness) without communicating with other validators.

Furthermore, the blockchain network architecture 100 may improve block proposal by reducing the processing load/cost associated with handling multiple block proposals concurrently and being required to select a proposal of the concurrent multiple proposals. The wrapped blockchain and referencing block header described herein may restrict proposal so as to advantageously avoid incurring additional load on the validators and latency of commitment. Multiple participants 110 may have access to the blockchain platform hosted by the participants 130 via an online or offline connection, such as a wireless connection, wired connection, ad hoc connection, mobile connection, satellite connection, and/or the like. Each of the participants 130 may be a computing device such as part of a cloud computing server including one or more desktop computers or panels mounted on racks, and/or the like. The panels may include processing boards and also switchboards, routers, and other network devices. The blockchain network architecture 100 will allow participants 110/130 to seamlessly transfer assets between chains.

The participants 130 may store data of the existing blockchain in a peer-to-peer (P2P) and/or distributed ledger fashion in a database 152. Database 152 may be a single database or a distributed database. The database 152 may store relevant information including, but not limited to, a shared registry, execution and verification logic, and/or rules for implementing consensus and messaging protocols. In particular, the participants 130 may function in conjunction to autonomously manage the decentralized database(s) of the existing blockchain via the P2P network and a distributed timestamping server of the participants 130. The participants 130 may be configured to implement multiple chains of the blockchain network architecture 100. For example, the participants 130 can implement a plurality of chains of the blockchain network architecture 100, such as an asset blockchain (e.g., for creating of new assets, asset exchange, cross-subnet transfers), metadata blockchain (e.g., for coordinating validators, tracking active subnets, and creating new subnets), smart contract blockchain (e.g., for creating smart contracts and applications that require total ordering), etc. The plurality of chains can be validated by a primary network of the blockchain network architecture 100 that comprises all existing subnets.

Figure 2:
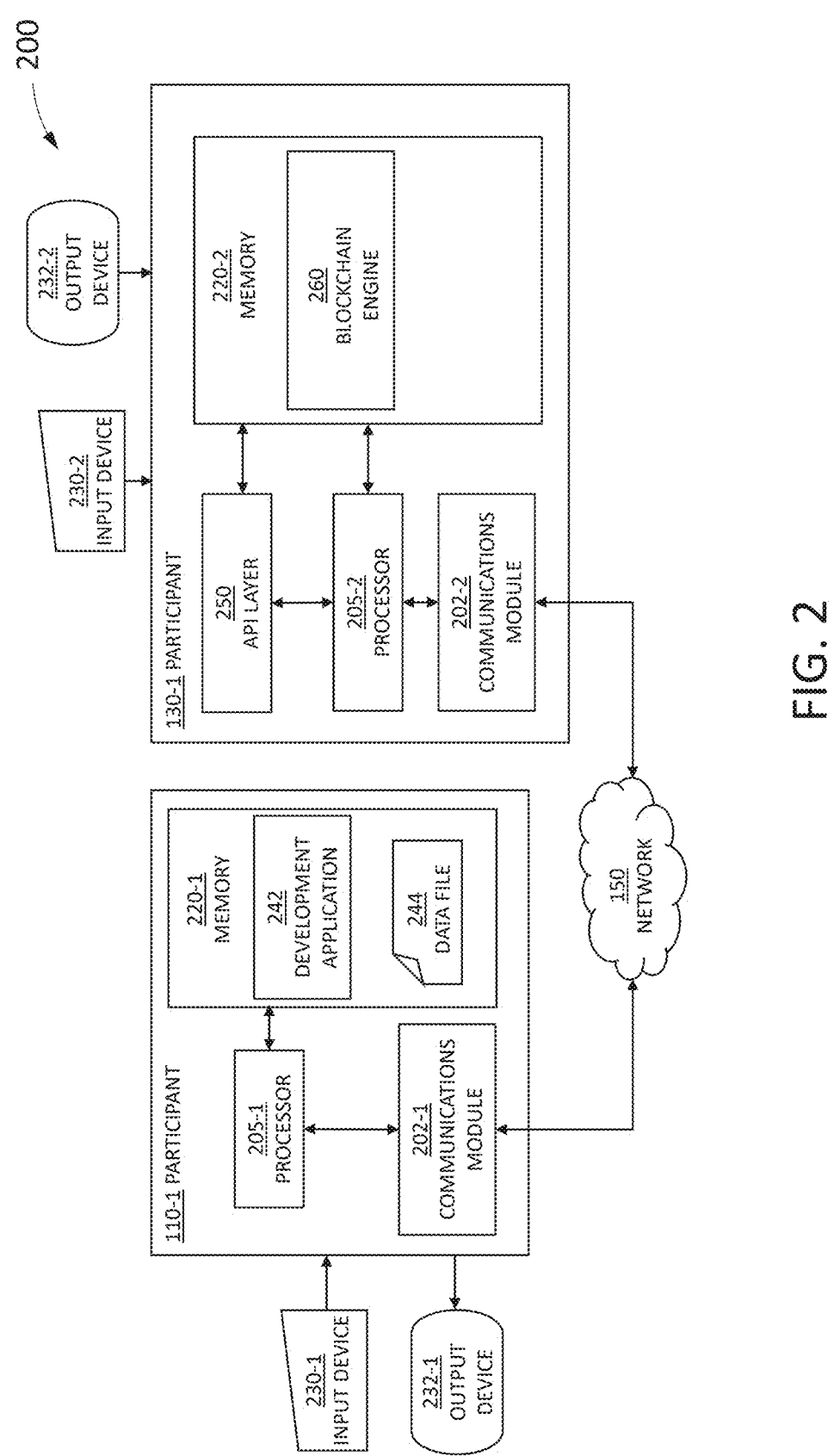
FIG. 2 is a block diagram illustrating details of a system for implementing a blockchain framework, according to some embodiments.

FIG. 2 is a block diagram illustrating details of a system 200 for implementing a blockchain framework, according to some embodiments. Specifically, the example of FIG. 2 illustrates an exemplary participant 110-1 (of the participants 110) and an exemplary participant 130-2 (of the participants 130) of the blockchain network architecture 100 of FIG. 1. The system 200 may implement protocols for blockchain-related consensus or messaging for any subnet or blockchain executing on the blockchain network architecture 100. A blockchain implemented on system 200 may include blockchains validated and secured by a primary subnet (e.g., primary network) comprising one or more of the participants 130 and/or participants 110. For example, in some embodiments, participant 110-1 and/or participant 130-1 may be configured to operate as blockchain validators to verify transactions on a blockchain.

The participant 110-1 and the participants 130-1 access each other and other devices in the network 150 via corresponding communications modules 202-1 and 202-2, respectively. The communications modules 202-1 and 202-2 may can be, for example, modems or Ethernet cards, and may include radio hardware and software for wireless communications (e.g., via electromagnetic radiation, such as radiofrequency (RF), near field communications (NFC), Wi-Fi, and Bluetooth radio technology). The participant 110-1 and participant 130-1 also include a processor 205-1 and processor 205-2, and a memory 220-1 and memory 220-2, respectively. Communications modules 202-1 and 202-2, processors 205-1 and 205-2, and memories 220-1 and 220-2 will be collectively referred to, hereinafter, as "communications modules 202," "processors 205," and "memories 220." Processors 205 may be configured to execute instructions stored in memories 220, to cause participant 110-1 and/or participant 130-1 to perform methods and operations consistent with embodiments of the present disclosure.

The participant 110-1 and the participant 130-1 are coupled to at least one input device 230-1 and input device 230-2, respectively (hereinafter, collectively referred to as "input devices 230"). The input devices 230 can include a mouse, a keyboard, a pointer, a stylus, a touchscreen, a microphone, voice recognition software, a joystick, a virtual joystick, a touch-screen display, and the like. The participant 110-1 and the participant 130-1 are also coupled to at least one output device 232-1 and output device 232-2, respectively (hereinafter, collectively referred to as "output devices 232"). The output devices 232 may include a display (e.g., a same touchscreen display used as an input device), a speaker, an alarm, and the like. A user may interact with participant 110-1 and/or participant 130-1 via the input devices 230 and the output devices 232.

The participant 110-1 can implement and/or manage the blockchain framework described herein by executing development application 242 executing within memory 220-1 and couple with input devices 230 and output devices 232. The development application 242 may be downloaded by a user from participant 130-1, and/or may be hosted by participant 130-1. Development application 242 may be installed in participant 110-1 by participant 130-1 and perform scripts and other routines provided by participant 130-1. The development application 242 includes specific instructions which, when executed by processor 205-1, perform operations consistent with embodiments of the present disclosure.

In some embodiments, the development application 242 runs on an operating system (OS) installed on participant 110-1. In some embodiments, development application 242 may run within a web browser. In some embodiments, the processor 205-1 is configured to control a graphical user interface (GUI) (spanning at least a portion of input devices 230 and output devices 232) for the user of participant 110-1 to access participant 130-1.

Data and files associated with the development application 242 may be stored in at least one local data file 244 stored in memory 220-1, a local database of participant 110-1 or participant 130-1, or an external database (e.g., database 152, a distributed database, and the like). The participant 110-1 may be used by a user of the blockchain framework to perform blockchain functions including, but not limited to, message transfer, exchange transactions, blockchain validation, block proposal, and the like.

Participant 130-1 includes an API layer 250, which may control the development application 242 in participant 110-1. API layer 250 may also provide instructions, procedural information, updates, or the like to participant 110-1 as, e.g., new features are uploaded in the development application 242.

In some embodiments, memory 220-2 includes a blockchain engine 260. The blockchain engine 260 may be configured to perform methods and operations consistent with embodiments of the present disclosure. The blockchain engine 260 may share or provide features and resources with the client device, including data, libraries, and/or applications retrieved with blockchain engine 260 (e.g., development application 242). The user may access the blockchain engine 260 through the development application 242.

Figure 3:
FIG. 3 is a flowchart illustrating a process of a consensus protocol including a single alpha consensus mechanism, according to some embodiments.

FIG. 3 is a flowchart illustrating a process 300 of a consensus protocol including a single alpha consensus mechanism, according to some embodiments. The process 300 may be performed by nodes of a blockchain network (e.g., a participant 110 and/or a participant 130). For example, one or more operations in process 300 may be performed by a processor circuit (e.g., processors 205, etc.) executing instructions stored in a memory circuit (e.g., memories 220, etc.) of a system (e.g., system 200, etc.) as disclosed herein. For example, operations in process 300 may be performed by development application 242, blockchain engine 260, or some combination thereof. In some embodiments, a process consistent with this disclosure may include at least operations in process 300 performed in a different order, simultaneously, quasi-simultaneously, or overlapping in time.

As shown in FIG. 3, at S302, the process 300 includes forming a random sample of K nodes (i.e., peers) in the network when a current node enters the consensus protocol. At S304, the process 300 includes obtaining current preferences of the K nodes (i.e., asking for their preference). At S306, the process 300 includes determining whether >=alpha (e.g., at least alpha nodes) respond with the same preference than the current preference of the current node. The alpha threshold is set below K.

If NO at S306, the process 300 proceeds to S308. At S308, the process 300 includes resetting a confidence counter to 0 and keeping the current preference. In some embodiments, the process 300 may begin a new round by returning to S302.

If YES at S306, >=alpha nodes respond with the same preference as each other, and the process 300 proceeds to S310.

At S310, the process 300 determines whether the same preference of the K nodes is different from the preference of the current node.

If YES at S310, the process 300 proceeds to S312. At S312, the process 300 resets the confidence counter to 1 and changes the current preference to match the same preference of the K nodes. In some embodiments, the process 300 may begin a new round by returning to S302.

If NO at S310, the process 300 proceeds to S314. At S314, the process 300 increments the confidence counter by 1 and keeps the current preference. In some embodiments, the process 300 may begin a new round by returning to S302.

As shown in FIG. 3, by polling K peers and setting an alpha threshold below K, the process 300 effectively ignores any additional information beyond hitting the alpha threshold.

FIG. 4 is a flowchart illustrating a process 400 of a consensus protocol including a multiple alpha consensus mechanism, according to some embodiments. The process 400 may be performed by nodes of a blockchain network (e.g., a participant 110 and/or a participant 130). In some embodiments, one or more operations in process 400 may be performed by a processor circuit (e.g., processors 205, etc.) executing instructions stored in a memory circuit (e.g., memories 220, etc.) of a system (e.g., system 200, etc.) as disclosed herein. For example, operations in process 400 may be performed by development application 242, blockchain engine 260, or some combination thereof. In some embodiments, a process consistent with this disclosure may include at least operations in process 400 performed in a different order, simultaneously, quasi-simultaneously, or overlapping in time.

In the example of FIG. 4, the protocol parameters are k, $\alpha 1$, $\alpha 2$, $\beta \in N > 0$ and satisfy the constraints that $\alpha 1 > k/2$ and $\alpha 2 \geq \alpha 1$. The parameter k determines sample sizes. The parameter $\alpha 1$ is used to determine when processor pi changes vali. Parameters $\alpha 2$ and $\beta$ are used to determine the conditions under which pi will output and terminate.

As shown in FIG. 4, at S402, a node u enters a consensus protocol round. At S404, the node u samples k peers in the network for their current preferences. At S406, the process 400 includes determining that the node u observes at least $\alpha 1$ of the reported values are 1−vali. At S408, based on S406, a current preference (vali) of the node u is set to vali:=1−vali.

At S410, the process 400 includes determining that the node u observes less than $\alpha 2$ of the reported preferences (or values) are equal to the current preference vali. At S412, based on S410, a counter is set to 0.

At S414, the process 400 includes determining that the node u observes at least $\alpha 2$ of the reported preferences (or values) are equal to the current preference vali. At S416, based on the at least $\alpha 2$ reported preferences being equal to vali, the counter is incremented by 1.

At S418, when the counter is at least $\beta$, the node u decides the current preference, outputs this value (i.e., vali). As such, if the node u has seen $\beta$ consecutive rounds in which at least $\alpha 2$ of the reported values are equal to vali, then pi outputs this value and terminates.

FIG. 5A and FIG. 5B are a flowchart illustrating a process 500 of a consensus protocol including a multiple alpha consensus mechanism, according to some embodiments. The process 500 may be performed by nodes of a blockchain network (e.g., a participant 110 and/or a participant 130). In some embodiments, one or more operations in process 500 may be performed by a processor circuit (e.g., processors 205, etc.) executing instructions stored in a memory circuit (e.g., memories 220, etc.) of a system (e.g., system 200, etc.) as disclosed herein. For example, operations in process 500 may be performed by development application 242, blockchain engine 260, or some combination thereof. In some embodiments, a process consistent with this disclosure may include at least operations in process 500 performed in a different order, simultaneously, quasi-simultaneously, or overlapping in time.

At S505, based on data received from the blockchain network, the process 500 determines a current preference value, the current preference value being one of multiple possible values. In some embodiments, the preference value may be one of two possible values (e.g., a binary value of 1 or 0, or a choice between two states such as yes/no, red/blue, etc.).

In the discussion that follows, parameter k is a sample size parameter. In some embodiments, the process 500 randomly selects a subset of k validator nodes from the plurality of validator nodes. In some embodiments, the process 500 selects the subset of k validator nodes from the plurality of validator nodes in lockstep.

At S510, from a subset of k validator nodes from the plurality of validator nodes, the process 500 receives corresponding k external preference values, each of the k external preference values being one of the possible values.

At S515, the process 500 defines alpha1 as a preference threshold value, such that alpha1 is greater than half of k. The parameter alpha1 is a preference parameter, that is used to determine when the process 500 changes its current preference value.

At S520, the process 500 defines alpha2 as a confidence threshold value, such that alpha2 is greater than or equal to alpha1. At S525, the process 500 defines beta2 as an iteration threshold value. Parameters alpha2 and beta2 are used to determine the conditions under which the process 500 will output a finalized value and terminate.

In some embodiments, at least one of k, alpha1, and alpha2 are integer values. If k is an odd-valued integer, alpha1 may be equal to $(k+1)/2$. If k is an even-valued integer, alpha1 may be equal to $k/2+1$.

The values alpha2 and beta2 form a confidence/iteration threshold pair, with the value of beta2 being determined at least in part by the value of alpha2. In some embodiments, the process 500 defines more than one confidence/iteration threshold pair (e.g., alpha3/beta3, alpha4/beta4, etc.). Higher confidence threshold values (alphas) are paired with lower iteration threshold values (betas), and vice versa.

At S530, the process 500 determines that at least alpha1 of the k external preference values are different than the current preference value, and the process 500 changes the current preference value to the other possible value.

At S535, responsive to a second determination that fewer than alpha2 of the k external preference values are equal to the current preference value, the process 500 sets a counter to zero.

At S540, responsive to a third determination that at least alpha2 of the k external preference values are equal to the current preference value, the process 500 increments the counter by 1.

At S545, responsive to the third determination and also to a fourth determination that the counter is equal to beta2, the process 500 provides the current preference value as a finalized output.

In some embodiments, including but not limited to embodiments where a portion of the blockchain network is a byzantine network, the process 500 further determines whether any/each of the k external preference values are finalized values and defines alpha3 as a finalization threshold value and beta3 as a corresponding iteration threshold value. Responsive to a determination that at least alpha3 of the external preference values are finalized preference values, the process 500 increases a second counter. Responsive to that determination and also to a determination that the second counter is equal to beta3, the process 500 provides the current preference value as the finalized output.

In some embodiments, the process 500 further defines beta4 as a liveness iteration threshold value, such that if the counter equals beta4, the process 500 provides an error as the finalized output.

In some embodiments, the process 500 may also receive a request for the current preference value from a particular validator node in the plurality of validator nodes. If the request is received while the process 500 has not yet finalized the current preference value, then the process 500 may return the current preference value as a non-finalized output. If the request is received after the process 500 has finalized the current preference value, then the process 500 may return the current preference value as a finalized output.

Embodiments, as disclosed herein, provide a solution to the above-mentioned problems rooted in computer technology, namely, providing consensus protocols that provide both safety and performance. By polling k peers and setting a single alpha threshold below k, single-alpha consensus protocols are effectively ignoring any additional information beyond hitting the alpha threshold. Some embodiments present a multiple alpha consensus mechanism that uses multiple alpha-beta pairs to further improve speed and efficiency of a consensus protocol. The multiple alpha consensus mechanism, according to embodiments, makes the additional contribution of changing from using a single alpha threshold to increment the confidence counter to using multiple (e.g., two or more) distinct alpha thresholds and corresponding beta values to decide when it is safe to commit. Some embodiments also provide a third alpha parameter that enables the network to sustain activating all-to-all consensus protocols when a correct node stalls and others continue to make progress, allowing correct nodes to continue making progress. Accordingly, using a multiple-alpha protocol (as described herein in some embodiments) meaningfully improves the performance of the core consensus mechanism, without the tradeoff of safety found in the single-alpha protocol.

Figure 6:
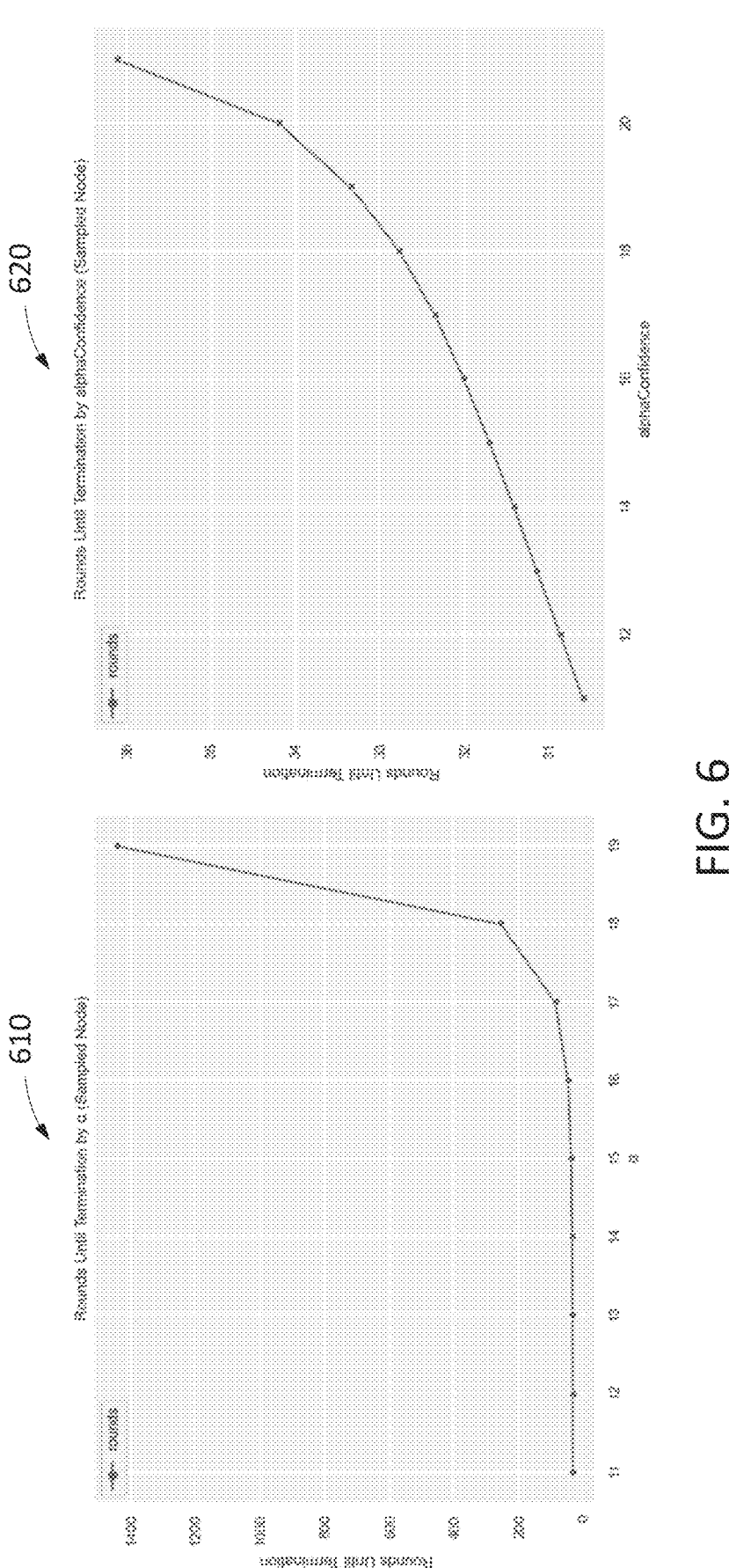
FIG. 6 illustrates a comparison of a consensus decision using a single alpha value for both preference threshold and confidence threshold, versus using separate alpha preference and confidence threshold values, according to some embodiments.

FIG. 6 illustrates a comparison of a consensus decision using a single alpha (a) value for both preference threshold and confidence threshold, versus using separate alpha preference and confidence threshold values, according to some embodiments. In FIG. 6, a single-alpha simulation is shown in the graph 610 on the left. The simulation parameters are number of validator nodes N=250, K=21, and beta ($\beta$)=30. The network is initialized with 125 Red and 125 Blue nodes, the colors representing the two possible preferences ("color") on which the network must reach consensus.

For small values of a, the majority of the sampling time is done to trigger the finalization mechanism. The finalization detector requires at least $\beta$=30 rounds until termination. However, as $\alpha$ increases, the number of rounds increases significantly higher than $\beta$. This is because the color selection mechanism becomes less aggressive as a increases towards K. For these reasons, $\alpha$=15 and K=20 are commonly used consensus parameters. In this example, the nodes perform random sampling, though the sampling could also be performed in lockstep. As the graph on the left in FIG. 6 shows, increasing $\alpha$ can significantly increase the required rounds until termination. This is because having a high $\alpha$ can take an extended amount of time for nodes to adopt the majority color. However, increasing $\alpha$ is often desirable to increase the safety of the decision. Using a single-alpha consensus protocol therefore involves a tradeoff between performance and safety.

In FIG. 6, a multiple-alpha simulation is shown in the graph 620 on the right. The simulation parameters are number of validator nodes N=250, K=21, and beta ($\beta$)=30.

Here, $\alpha$1=11, being used solely as the preference threshold. As in the single-alpha example, the network is initialized with 125 Red and 125 Blue nodes, the colors representing the two possible preferences ("color") on which the network must reach consensus.

As the graph on the right in FIG. 6 shows, keeping $\alpha$1 (preference threshold) constant while increasing $\alpha$2 (confidence threshold) increases the rounds until termination significantly less than increasing $\alpha$ in the single-alpha protocol. For example, the single-alpha protocol requires 1400 rounds when $\alpha$=19, compared to only 33 rounds when $\alpha$1=11 and $\alpha$2=19. The high value of $\alpha$2 provides comparable safety to the single-alpha scenario, while the low value of $\alpha$1 provides performance.

While modifying the color selection does impact the safety analysis, the impact is not expected to be significant. As a simple argument for why safety shouldn't be drastically impacted, consider the case that one virtuous node has accepted Red. If byzantine nodes switching their color to Blue caused polls to see more Blue than Red, safety will eventually be violated. This is because eventually nodes will switch their preferences, except for the one node that has accepted Red, to Blue. Once enough nodes have updated their preferences to Blue, another virtuous node may accept Blue. Notice that this is independent of $\alpha$. $\alpha$ in this situation only impacts the speed at which such a failure would occur. The actual impact on the safety analysis is due to the variance in sampling. Larger a values protect more against unlikely samples of a disproportionate number of byzantine nodes.

Accordingly, using a multiple-alpha protocol (as described above in some embodiments) meaningfully improves the performance of the core consensus mechanism, without the tradeoff of safety found in the single-alpha protocol.

Protocol for Byzantine Agreement

An exemplary embodiment of a probabilistic protocol for binary byzantine agreement is now described, which is a building block for the consensus protocol of some embodiments:

Inputs. Each processor $p_i$ begins with a value $input_i \in \{0,1\}$ and maintains a variable $val_i$ initially set to $input_i$.

Requirements. A probabilistic protocol for Byzantine agreement may be required to satisfy the following properties, except with small error probability:

Agreement: No two correct processors output different values.

Validity: If every correct processor i has the same value $input_i$, then no correct processor outputs a value different than this common input.

Termination: Every correct processor gives an output.

Below, embodiments of multi-alpha consensus protocol are shows to satisfy the agreement and validity requirements for appropriate choices of the protocol parameters, and so long as the fraction of the blockchain network that is byzantine is less than one-fifth (f<n/5).

Protocol parameters. The protocol parameters are k, $\alpha_1$, $\alpha_2$, $\beta \in \mathbb{N}_{>0}$ and satisfy the constraints that $\alpha_1 > k/2$ and $\alpha_2 \geq \alpha_1$. The parameter k determines sample sizes. The parameter $\alpha_1$ is used to determine when processor $p_i$ changes $val_i$. Parameters $\alpha_2$ and $\beta$ are used to determine the conditions under which $p_i$ will output and terminate.

Protocol instructions. The instructions are divided into rounds, with round s occurring at time $2\Delta s$. In round s, processor $p_i$:

(1) Sets $\langle p_{1,s}, \ldots p_{k,s} \rangle$ to be a sequence of k processors (specific to $p_i$). For $j \in [1, k]$, $p_{j,s}$ is sampled from the uniform distribution on all processors (so sampling is "with replacement").

(2) Requests each $p_{j,s}$ (for $j \in [1, k]$) to report its present value $val_j$.

(3) Waits time $\Delta$ and reports its present value $val_i$ to any processor that has requested it in round s.

(4) Waits another $\Delta$ and considers the values reported in round s:

If at least $\alpha_1$ of the reported values are $1 - val_i$, then $p_i$ sets $val_i := 1 - val_i$.

Otherwise, if $p_i$ has seen $\beta$ consecutive rounds in which at least $\alpha_2$ of the reported values are equal to $val_i$, then $p_i$ outputs this value and terminates.

The pseudocode ("Algorithm 1") is described in Table 1 below.

TABLE 1

Pseudocode for Algorithm 1.
Algorithm 1 - The instructions for processor $p_i$

```
 1: Inputs
 2: input_i ∈ {0,1}                                        ▷ p_i's input
 3: Δ, k, a_1, a_2, β ∈ ℕ                                  ▷ Protocol parameters
 4: Local variables
 5: val__i, initially set to input__i                       ▷ p_i's present 'value'
 6: count, initially set to 0                               ▷ Output once count reaches β
 7: v_i(j, s), initially undefined                          ▷ Stores at most one received value per round
 8:
 9: The instructions for round s, beginning at time 2Δs:
10:     Form sample sequence⟨p_1,s,...p_k,s⟩;              ▷ Sample with replacement
11:     For j ∈ [1, k], send s to p_j,s;                   ▷ Ask p_j,s for present value
12:     Wait Δ;
13:     For each j such that p_i has received s from p_j:
14:         Send (s, val_i) to p_j;
15:     Wait Δ;
16:     For each j ∈ [1, k]:
17:         If p_i has received a first message (s, v) from p_j,s;
18          Set v_i(j, s) := v;
19:         Else set v_i(j, s) := ⊥;
20:     If|{j : 1 ≤ j ≤ k, v_i(j, s) == 1 − val_i}| ≥ α_1, set val_i: = 1 − val_i, count: = 0;
21:     If|{j : 1 ≤ j ≤ k, v_i(j, s) == val_i}| < α_2, set count: = 0;
22:     If|{j : 1 ≤ j ≤ k, v_i(j, s) == val_i}| ≥ α_2, set count: = count + 1;
23:     If count ≥ β, output val_i and terminate.
```

Security Analysis

A security analysis of the above-described probabilistic protocol for binary byzantine agreement is now described.

In this example, it is assumed that assume that the fraction of the blockchain network that is byzantine is less than one-fifth, so that $f < n/5$. For the sake of concreteness, satisfaction of agreement and validity is established for $k=80$, $\alpha_1=41$, $\alpha_2=72$, and $\beta=12$, under the assumption that the population size $n \geq 500$. The assumption that $n \geq 500$ is made so as to be able to give as simple a proof as possible.

Coloring the processors. Since 0 and 1 are not generally used as adjectives, a correct processor $p_i$ will be referred to as 'blue' in round s if $val_i=0$ at the beginning of round s, and that $p_i$ will be referred to as 'red' in round s if $val_i=1$ at the beginning of round s. Recall (from Algorithm 1) that $v_i(j,s)$ is the color that $p_j$ reports to $p_i$ in round s. A correct processor $p_i$ 'samples x blue' in round s if $|\{j : 1 \leq j \leq k, v_i(j,s)=0\}|=x$ (and similarly for red). This terminology is also extended by saying that a processor outputs 'blue' if it outputs 0 and outputs 'red' if it outputs 1.

This example focuses on the case that, in the first round in which a correct processor outputs (should such a round exist), some correct processor outputs red. A symmetric argument can be made for blue.

Establishing Agreement. First, consider what happens when the proportion of correct processors that are red reaches a certain threshold. In particular, consider what happens when at least 75% of the correct processors are red in a given round s. A calculation for the binomial distribution shows that the probability a given correct processor is red in round s+1 is then at least 0.9555, i.e. Bin $(80, 0.8 \times 0.75 \geq 41)$ $>0.9555$. Assuming a population of at least 500, of which at least 80% are correct, another calculation for the binomial distribution shows that the probability that it fails to be the case that more than $5/6$ of the correct processors are red in round s+1 is upper bounded by $1.59 \times 10^{-20}$, i.e. Bin(n, $0.9555, \leq 5n/6) < 1.59 \times 10^{-20}$ for $n \geq 400$. For a population of at least 500, and by iterating this argument over rounds, the analysis can therefore condition on the following event:

($\dagger_1$) If at least 75% of the correct processors are red in any round s, then, in all rounds s' with $s'>s$, more than $5/6$ of the correct processors are red.

Another calculation for the binomial distribution shows that if at least 75% of correct processors are red in a given round s, then the probability that a given correct processor $p_i$ samples at least 72 blue in round s is upper bounded by $1.18 \times 10^{-20}$, i.e. Bin(80, $0.2+(0.8 \times 0.25), \geq 72) < 1.18 \times 10^{-20}$. The analysis can therefore condition on the following event:

($\dagger_2$) If at least 75% of the correct processors are red in any round s, then no correct processor samples at least 72 blue in round s.

Another calculation for the binomial distribution shows that, if at most 75% of correct processors are red in a given round s, then the probability a given correct processor samples 72 or more red in round s is upper bounded by 0.0131, i.e. Bin (80, $(0.75 \times 0.8)+0.2, \geq 72) < 0.0131$. So, if 12 consecutive rounds are considered in which at most 75% of the correct processors are red, the probability a given correct processor samples at least 72 red in each round is upper bounded by $10^{-22}$. The analysis can therefore condition on the following event:

($\dagger_3$) If a correct processor outputs red in round s+11, then, for at least one round $s' \in [s, s+11]$, at least 75% of correct nodes are red in round s'.

According to ($\dagger_3$), if a correct processor is the (potentially joint) first to output and outputs red after sampling in round $s+11$, at least one round $s' \in [s, s+11]$ must satisfy the condition that at least 75% of correct processors are red in round $s'$. Then, given the prior assumption ($\dagger_1$), at least ⅚ of the correct processors must be red in all rounds $>s'$. From assumption ($\dagger_2$), it follows that no correct processor ever outputs blue. This suffices to show that Agreement is satisfied, except with small error probability.

Establishing Validity. A similar argument suffices to establish validity. Suppose that all honest nodes have the same input, red say (i.e. 1). By the same reasoning as above, since round 0 satisfies the condition that at least 75% (in fact 100%) of correct processors are red, the analysis can then condition on the following event:

($\dagger_4$) In every round, more than ⅚ of the correct processors are red.

From ($\dagger_2$) and ($\dagger_4$) it follows that no correct processor outputs blue, as required.

Dealing with different parameter values. The argument above may be adapted to deal with alternative parameter values. If we fix $\alpha_1 := [k/2]+1$, then error probabilities will be smaller for larger values of $\alpha_2$ and $\beta$. For smaller values of $\alpha_2$, similar error probabilities can be obtained by increasing $\beta$—the required values for $\beta$ are found by adapting the binomial calculations above. Examples are given below.

Counting the accumulation of small error probabilities. Suppose that at most 10,000 processors run the protocol for at most 1000 years, executing at most five rounds each second.

In the analysis above, the case was considered that there is a first round $s$ in which at least 75% of the correct processors are red. The analysis concluded that the probability that it fails to be the case that more than ⅚ of the correct processors are red in round $s+1$ is upper bounded by $1.59 \times 10^{-20}$. This argument was iterated over rounds. If there are five rounds per second then, over a period of 1000 years, this means that less than $1.6 \times 10^{11}$ rounds are executed. The union bound thus gives a cumulative error probability of less than $3 \times 10^{-9}$.

The analysis also considered the case that at least 75% of correct processors are red in a given round $s$, and concluded that the probability that a given correct processor $p_i$ samples at least 72 blue in round $s$ is upper bounded by $1.18 \times 10^{-20}$. For 10,000 processors executing at most $1.6 \times 10^{11}$ rounds, the union bound this gives a cumulative error probability of less than $2 \times 10^{-5}$.

The analysis also considered any 12 consecutive rounds in which at most 75% of the correct processors are red, and concluded that the probability a given correct processor samples at least 72 red in each round is upper bounded by $10^{-22}$. For 10,000 processors executing at most $1.6 \times 10^{11}$ rounds, this gives a cumulative error probability of less than $2 \times 10^{-7}$.

Adding these cumulative error probabilities (and applying the union bound), one can conclude that, for at most 10,000 processors running the protocol for 1000 years, the chance of a consistency violation is upper bounded by $3 \times 10^{-5}$.

Flexible Protocol

In the above security analysis, a fixed value was considered of $\alpha_2=72$, for $k=80$. While considering a fixed $\alpha_2$ suffices for the analysis there, it is also useful to consider multiple values of $\alpha_2$, giving rise to a number of different conditions for termination. Considering a range of termination conditions for different values of $\alpha_2$ serves two functions: Considering lower values of $\alpha_2$ allows one to deal with a greater percentage of offline/faulty processors, while higher values of $\alpha_2$ give quick decision conditions and low latency in the good case.

Some embodiments provide a flexible protocol in which all possible values of $\alpha_2 \leq k$ are simultaneously considered. Each $\alpha_2$ now gives rise to a different $\beta$ that determines the conditions for termination. The corresponding values for this example are shown in Table 2.

How the values in Table 1 are calculated. In the above analysis, it was ($\dagger_3$) which played a crucial role in establishing the relationship between $\alpha_2$ and $\beta$ for a given error probability $\epsilon > 0$. Assuming that at most 75% of correct processors are red, a calculation for the binomial distribution then upper bounds the probability $p$ that a given correct processor samples at least $\alpha_2$ red in a given round. For a given error probability $\epsilon$, the corresponding $\beta$ shown in Table 2 is the least integer such that $p^\beta < \epsilon$. The value $p^\beta$ upper bounds the probability of a given correct processor sampling at least $\alpha_2$ red in $\beta$ given consecutive rounds, under the assumption that at most 75% of correct processors are red in each round.

Table 2 also shows how $\beta$ depends on $\alpha_2$ for larger error bounds ($\epsilon < 10^{-14}$ and $\epsilon < 10^{-6}$). Correct processors may use the corresponding lower values of $\beta$ in the case that they are willing to accept higher error probabilities for the sake of achieving low latency, i.e. terminating in a small number of rounds.

Low latency in standard operation. As known by persons of ordinary skill in the art, at any given point in time, one can expect close to 100% of contributing processors to act correctly. For the flexible consensus protocol of some embodiments, this corresponds to a scenario where the vast majority of processors are correct, and where initial inputs are generally highly biased in favor of one color. The conditions in Table 2 that allow for quick termination (using $\beta=3$, 4 or 5, for example) can therefore be expected to be commonly satisfied and give a significant improvement in latency for the standard 'good' case.

The accumulation of error probabilities. Accepting multiple conditions for termination gives an overall error probability that can be (generously) upper bounded simply by applying the union bound. In Table 2, 16 different termination conditions are listed. If processors apply all of these termination conditions simultaneously, this will lead to at most a 16-fold increase in error probability.

TABLE 2

| | The required $\beta$ as a function of $\alpha_2$ and the error bound. | | |
| --- | --- | --- | --- |
| $\alpha_2$ | $\beta$ for $\epsilon < 10^{-22}$ | $\beta$ for $\epsilon < 10^{-14}$ | $\beta$ for $\epsilon < 10^{-6}$ |
| 80 | 3 | 2 | 1 |
| 79 | 4 | 3 | 1 |
| 78 | 5 | 3 | 2 |
| 77 | 5 | 4 | 2 |
| 76 | 6 | 4 | 2 |
| 75 | 7 | 5 | 2 |
| 74 | 9 | 6 | 3 |
| 73 | 10 | 7 | 3 |
| 72 | 12 | 8 | 4 |
| 71 | 15 | 10 | 4 |
| 70 | 18 | 12 | 5 |
| 69 | 23 | 15 | 7 |
| 68 | 29 | 18 | 8 |
| 67 | 37 | 24 | 10 |
| 66 | 48 | 31 | 14 |

The above analysis significantly overestimates the error probability. If one applies all 16 termination conditions listed in Table 2, this does not impact the probability that $(\dagger_1)$ or $(\dagger_2)$ hold and only impacts the probability that $(\dagger_3)$ holds. In the above analysis, it was shown that if 10,000 processors run the protocol for 1000 years, executing at most 5 rounds a second, then the probability that $(\dagger_3)$ fails is less than $2\times10^{-7}$. Applying the union bound and multiplying by 16, one can conclude that $(\dagger_3)$ fails to hold with probability at most $3.2\times10^{-6}$ when the 16 different termination conditions of Table 2 are applied. Adding the probability that either of $(\dagger_1)$ or $(f_2)$ fails to hold still gives an overall error probability of less than $3\times10^{-5}$ (the same bound provided in the above analysis).

FIG. 7 is a block diagram illustrating an exemplary computer system 700 with which aspects of the subject technology can be implemented. In certain aspects, the computer system 700 may be implemented using hardware or a combination of software and hardware, either in a dedicated server, integrated into another entity, or distributed across multiple entities.

Computer system 700 includes a bus 708 or other communication mechanism for communicating information, and a processor 702 coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, i.e., one or more modules of computer program instructions encoded on a computer-readable medium for execution by, or to control the operation of, the computer system 700, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, the input/output module 710 is configured to connect to a plurality of devices, such as an input device 714 and/or an output device 716. Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 716 include display devices such as an LCD (liquid crystal display) monitor, for displaying information to the user.

According to one aspect of the present disclosure, the above-described system 200 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in the main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

The techniques described herein may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

As the user computing system 700 reads application data and provides an application, information may be read from the application data and stored in a memory device, such as the memory 704. Additionally, data from the memory 704 servers accessed via a network, the bus 708, or the data storage device 706 may be read and loaded into the memory 704. Although data is described as being found in the memory 704, it will be understood that data does not have to be stored in the memory 704 and may be stored in other memory accessible to the processor 702 or distributed among several media, such as the data storage device 706.

Many of the above-described features and applications may be implemented as software processes that are specified as a set of instructions recorded on a computer-readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer-readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer-readable media does not include carrier waves and electronic signals passing wirelessly or over wired connections, or any other ephemeral signals. For example, the computer-readable media may be entirely restricted to tangible, physical objects that store information in a form that is readable by a computer. In some embodiments, the computer-readable media is non-transitory computer-readable media, or non-transitory computer-readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

REFERENCES

[1] Frosty: Bringing strong liveness guarantees to the Snow family of consensus protocols. arXiv:2404.14250v6 [cs.DC]30 Sep. 2024.

[2] Split Alpha into AlphaPreference and AlphaConfidence, #2125. Github repository https://github.com/ava-labs/avalanchego/pull/2125, retrieved 6 Oct. 2024.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon implementation preferences, it is understood that the specific order or hierarchy of blocks in the processes may be rearranged, or that not all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject technology is illustrated, for example, according to various aspects described above. The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure.

To the extent that the terms "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. In one aspect, various alternative configurations and operations described herein may be considered to be at least equivalent.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain. It is understood that some or all steps, operations, or processes may be performed automatically, without the intervention of a user.

Method claims may be provided to present elements of the various steps, operations, or processes in a sample order, and are not meant to be limited to the specific order or hierarchy presented.

In one aspect, a method may be an operation, an instruction, or a function and vice versa. In one aspect, a claim may be amended to include some or all of the words (e.g., instructions, operations, functions, or components) recited in other one or more claims, one or more words, one or more sentences, one or more phrases, one or more paragraphs, and/or one or more claims.

All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

The Title, Background, and Brief Description of the Drawings of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the included subject matter requires more features than are expressly recited in any claim. Rather, as the claims reflect, inventive subject matter lies in less than all features of a single disclosed configuration or operation. The claims are hereby incorporated into the Detailed Description, with each claim standing on its own to represent separately patentable subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirement of 35 U.S.C. § 101, 102, or 103, nor should they be interpreted in such a way.

Embodiments consistent with the present disclosure may be combined with any combination of features or aspects of embodiments described herein.

The invention claimed is:

1. A method for determining consensus on a blockchain network comprising a plurality of validator nodes, comprising:

based on data received from the blockchain network, determining a current preference value, the current preference value being one of two possible values;

from a subset of k validator nodes from the plurality of validator nodes, receiving corresponding k external preference values, each of the k external preference values being one of the two possible values;

defining alpha1 as a preference threshold value, wherein alpha1 is greater than half of k;

defining alpha2 as a confidence threshold value, wherein alpha2 is greater than or equal to alpha1;

based on the preference threshold value of alpha1 and the confidence threshold value of alpha2, defining beta2 as an iteration threshold value;

responsive to a first determination that at least alpha1 of the k external preference values are different than the current preference value, changing the current preference value to another possible value;

responsive to a second determination that fewer than alpha2 of the k external preference values are equal to the current preference value, setting a counter to zero;

responsive to a third determination that at least alpha2 of the k external preference values are equal to the current preference value, increasing the counter by 1; and responsive to the third determination and also to a fourth determination that the counter is equal to beta2, providing the current preference value as a finalized output.

2. The method of claim 1, wherein the counter is a first counter, alpha2 is a first confidence threshold value, beta2 is a first iteration threshold value, and the method further comprises:

defining alpha3 as a second confidence threshold value, wherein alpha3 is greater than or equal to alpha1 and alpha3 is not equal to alpha2;

defining beta3 as a second iteration threshold value, wherein beta3 is not equal to beta2;

responsive to a fifth determination that fewer than alpha3 of the k external preference values are equal to the current preference value, setting a second counter to zero;

responsive to a sixth determination that at least alpha3 of the k external preference values are equal to the current preference value, increasing the second counter by 1; and responsive to the sixth determination and also to a seventh determination that the second counter is equal to beta3, providing the current preference value as the finalized output.

3. The method of claim 2, wherein alpha3 is greater than alpha2 and beta3 is less than beta2.

4. The method of claim 2, wherein alpha3 is less than alpha2 and beta3 is greater than beta2.

5. The method of claim 1, wherein the counter is a first counter, beta2 is a first iteration threshold value, and the method further comprises:

from the subset of k validator nodes from the plurality of validator nodes, further receiving indications that each of the k external preference values is either a finalized preference value or a non-finalized preference value;

defining alpha3 as a finalization threshold value, wherein alpha3 is greater than or equal to alpha1 and alpha3 is not equal to alpha2;

defining beta3 as a second iteration threshold value, wherein beta3 is not equal to beta2;

responsive to a fifth determination that fewer than alpha3 of the external preference values are finalized preference values, setting a second counter to zero;

responsive to a sixth determination that at least alpha3 of the external preference values are finalized preference values, increasing the second counter by 1; and responsive to the sixth determination and also to a seventh determination that the second counter is equal to beta3, providing the current preference value as the finalized output.

6. The method of claim 5, wherein a portion of the blockchain network is a byzantine network.

7. The method of claim 1, wherein beta2 is a first iteration threshold value, and the method further comprises:

defining beta3 as a second iteration threshold value, wherein beta3 is greater than beta2; and responsive to a fifth determination that the counter is equal to beta3, providing an error as the finalized output.

8. The method of claim 1, further comprising:

prior to the third determination, receiving a request for the current preference value from a particular validator node in the plurality of validator nodes; and in response to receiving the request, providing the current preference value to the particular validator node as a non-finalized output.

9. The method of claim 1, further comprising:

subsequent to the fourth determination, receiving a request for the current preference value from a particular validator node in the plurality of validator nodes; and in response to receiving the request, providing the current preference value to the particular validator node as the finalized output.

10. The method of claim 1, further comprising randomly selecting the subset of k validator nodes from the plurality of validator nodes.

11. The method of claim 1, further comprising selecting the subset of k validator nodes from the plurality of validator nodes in lockstep.

12. The method of claim 1, wherein k, alpha1, and alpha2 are integer values.

13. The method of claim 12, wherein k is an odd-valued integer and alpha1 is equal to (k+1)/2.

14. The method of claim 12, wherein k is an even-valued integer and alpha1 is equal to k/2+1.

15. A non-transitory computer-readable medium storing a program for determining consensus on a blockchain network comprising a plurality of validator nodes, which when executed by a computer, configures the computer to:

based on data received from the blockchain network, determine a current preference value, the current preference value being one of two possible values; from a subset of k validator nodes from the plurality of validator nodes, receive corresponding k external preference values, each of the k external preference values being one of the two possible values;

define alpha1 as a preference threshold value, wherein alpha1 is greater than half of k;

define alpha2 as a confidence threshold value, wherein alpha2 is greater than or equal to alpha1;

based on the preference threshold value of alpha1 and the confidence threshold value of alpha2, define beta2 as an iteration threshold value;

responsive to a first determination that at least alpha1 of the k external preference values are different than the current preference value, change the current preference value to another possible value; responsive to a second determination that fewer than alpha2 of the k external preference values are equal to the current preference value, set a counter to zero;

responsive to a third determination that at least alpha2 of the k external preference values are equal to the current preference value, increase the counter by 1; and responsive to the third determination and also to a fourth determination that the counter is equal to beta2, provide the current preference value as a finalized output.

16. The non-transitory computer-readable medium of claim 15, wherein the counter is a first counter, alpha2 is a first confidence threshold value, beta2 is a first iteration threshold value, and the program, when executed by the computer, further configures the computer to:

define alpha3 as a second confidence threshold value, wherein alpha3 is greater than or equal to alpha1 and alpha3 is not equal to alpha2;

define beta3 as a second iteration threshold value, wherein beta3 is not equal to beta2;

responsive to a fifth determination that fewer than alpha3 of the k external preference values are equal to the current preference value, set a second counter to zero;

responsive to a sixth determination that at least alpha3 of the k external preference values are equal to the current preference value, increase the second counter by 1; and responsive to the sixth determination and also to a seventh determination that the second counter is equal to beta3, provide the current preference value as the finalized output.

17. The non-transitory computer-readable medium of claim 15, wherein the counter is a first counter, beta2 is a first iteration threshold value, and the program, when executed by the computer, further configures the computer to:

from the subset of k validator nodes from the plurality of validator nodes, further receive indications that each of the k external preference values is either a finalized preference value or a non-finalized preference value;

define alpha3 as a finalization threshold value, wherein alpha3 is greater than or equal to alpha1 and alpha3 is not equal to alpha2;

define beta3 as a second iteration threshold value, wherein beta3 is not equal to beta2;

responsive to a fifth determination that fewer than alpha3 of the external preference values are finalized preference values, set a second counter to zero;

responsive to a sixth determination that at least alpha3 of the external preference values are finalized preference values, increase the second counter by 1; and responsive to the sixth determination and also to a seventh determination that the second counter is equal to beta3, provide the current preference value as the finalized output.

18. The non-transitory computer-readable medium of claim 15, wherein beta2 is a first iteration threshold value, and the program, when executed by the computer, further configures the computer to:

define beta3 as a second iteration threshold value, wherein beta3 is greater than beta2; and responsive to a fifth determination that the counter is equal to beta3, provide an error as the finalized output.

19. The non-transitory computer-readable medium of claim 15, wherein the program, when executed by the computer, further configures the computer to:

prior to the third determination, receive a first request for the current preference value from a first validator node in the plurality of validator nodes;

in response to receiving the first request, provide the current preference value to the first validator node as a non-finalized output;

subsequent to the fourth determination, receive a second request for the current preference value from a second validator node in the plurality of validator nodes; and in response to receiving the second request, provide the current preference value to the second validator node as the finalized output.

20. A system for determining consensus on a blockchain network comprising a plurality of validator nodes, comprising:

a processor; and a non-transitory computer readable medium storing a set of instructions, which when executed by the processor, configure the system to:

based on data received from the blockchain network, determine a current preference value, the current preference value being one of two possible values;

from a subset of k validator nodes from the plurality of validator nodes, receive corresponding k external preference values, each of the k external preference values being one of the two possible values;

define alpha1 as a preference threshold value, wherein alpha1 is greater than half of k;

define alpha2 as a confidence threshold value, wherein alpha2 is greater than or equal to alpha1;

based on the preference threshold value of alpha1 and the confidence threshold value of alpha2, define beta2 as an iteration threshold value;

responsive to a first determination that at least alpha1 of the k external preference values are different than the current preference value, change the current preference value to another possible value;

responsive to a second determination that fewer than alpha2 of the k external preference values are equal to the current preference value, set a counter to zero;

responsive to a third determination that at least alpha2 of the k external preference values are equal to the current preference value, increase the counter by 1; and responsive to the third determination and also to a fourth determination that the counter is equal to beta2, provide the current preference value as a finalized output.

\* \* \* \* \*